US009904663B2

(12) United States Patent
Yonemochi

(10) Patent No.: US 9,904,663 B2
(45) Date of Patent: Feb. 27, 2018

(54) INFORMATION PROCESSING APPARATUS, INFORMATION PROCESSING METHOD, AND INFORMATION PROCESSING PROGRAM

(71) Applicant: International Business Machines Corporation, Armonk, NY (US)

(72) Inventor: Yukihisa Yonemochi, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 976 days.

(21) Appl. No.: 14/153,444

(22) Filed: Jan. 13, 2014

(65) Prior Publication Data
US 2014/0215326 A1  Jul. 31, 2014

(30) Foreign Application Priority Data
Jan. 30, 2013  (JP) .................................. 2013-015626

(51) Int. Cl.
G06F 17/30  (2006.01)
G06F 17/22  (2006.01)

(52) U.S. Cl.
CPC .... *G06F 17/2235* (2013.01); *G06F 17/30654* (2013.01); *G06F 17/30657* (2013.01); *G06F 17/30985* (2013.01)

(58) Field of Classification Search
CPC ................... G06F 17/3089; G06F 17/30864
See application file for complete search history.

(56) References Cited

U.S. PATENT DOCUMENTS

| | | | | |
|---|---|---|---|---|
| 6,044,387 A * | 3/2000 | Angiulo | .................. | G06F 17/24 707/999.003 |
| 7,003,719 B1 * | 2/2006 | Rosenoff | ........... | G06F 17/30014 704/4 |
| 7,222,299 B1 * | 5/2007 | Lim | ....................... | G06F 17/218 715/273 |
| 7,464,326 B2 * | 12/2008 | Kawai | ................. | G06F 17/3089 707/E17.116 |
| 7,827,254 B1 * | 11/2010 | Nevill-Manning | ........... | G06F 17/30864 709/217 |
| 8,359,533 B2 * | 1/2013 | Dexter | .................... | G06F 17/24 715/200 |
| 8,869,036 B1 * | 10/2014 | Deshpande | ......... | G06F 11/3065 715/736 |
| 9,418,144 B2 * | 8/2016 | Sperling | ............. | G06F 17/3069 |
| 2002/0089533 A1 * | 7/2002 | Hollaar | .............. | G06F 17/30014 715/738 |

(Continued)

FOREIGN PATENT DOCUMENTS

JP   2798039 B2   9/1998
JP   11143912 A   5/1999

(Continued)

*Primary Examiner* — Scott Baderman
*Assistant Examiner* — Mario M Velez-Lopez
(74) *Attorney, Agent, or Firm* — Heather S. Chatterton

(57) ABSTRACT

Provided is an information processing apparatus including: a detection unit for detecting quotations from a plurality of texts from other texts; a conversion unit for deleting or replacing with predetermined character strings the quotations in a plurality of the texts; and a text mining unit for executing text mining for a plurality of the converted texts.

19 Claims, 10 Drawing Sheets

(56) References Cited

U.S. PATENT DOCUMENTS

| | | | | |
|---|---|---|---|---|
| 2004/0117736 A1* | 6/2004 | Newman | ............... | G06Q 10/107 |
| | | | | 715/256 |
| 2006/0149720 A1* | 7/2006 | Dehlinger | ......... | G06F 17/30616 |
| 2006/0236217 A1* | 10/2006 | Michelstein | ........ | G06F 17/2247 |
| | | | | 715/255 |
| 2006/0287971 A1* | 12/2006 | Armstrong | ........ | G06F 17/30728 |
| 2009/0234816 A1* | 9/2009 | Armstrong | ........ | G06F 17/30728 |
| 2011/0153601 A1* | 6/2011 | Nakazawa | .......... | G06F 17/3069 |
| | | | | 707/723 |
| 2012/0041939 A1* | 2/2012 | Amsterdamski | .. | G06F 17/30867 |
| | | | | 707/709 |
| 2012/0324349 A1* | 12/2012 | Pop-Lazarov | ...... | G06F 17/2705 |
| | | | | 715/256 |
| 2013/0007220 A1* | 1/2013 | Astle | ................ | G06F 17/30079 |
| | | | | 709/219 |
| 2013/0212090 A1* | 8/2013 | Sperling | ............. | G06F 17/3069 |
| | | | | 707/723 |
| 2013/0218896 A1* | 8/2013 | Palay | ................ | G06F 17/30312 |
| | | | | 707/741 |
| 2014/0095966 A1* | 4/2014 | Burkard | ............ | G06F 17/30902 |
| | | | | 715/205 |
| 2015/0088910 A1* | 3/2015 | Misra | ................ | G06F 17/30719 |
| | | | | 707/749 |

FOREIGN PATENT DOCUMENTS

| | | |
|---|---|---|
| JP | 2001034626 A | 2/2001 |
| JP | 2002342346 A | 11/2002 |
| JP | 2006031431 A | 2/2006 |
| JP | 2007087110 A | 4/2007 |
| JP | 4385119 B2 | 12/2009 |
| JP | 2010231508 A | 10/2010 |
| JP | 2011-003157 | 6/2011 |

\* cited by examiner

| Final Reference Target Information | Other Reference Target Information |
|---|---|
| http://www.XXXXXXitnews.co.jp/news1111 | http://XXX.XX/123XYZ<br>http://YYY.YY/987AB |
| http://nikko.com/news/20120xxxxx.html | http://XXX.XX/356CDE |
| http://www.ibm.com/press/2012/0x/0x/xx | http://XXX.XX/456DEF |
| http://www.blog.com/hogehoge/2012xxxx | http://XXX.XX/567EFG |
| ⋮ | ⋮ |

FIG. 4

Text 1:
IBM Japan has announced Pure Systems as an IT product for a new era. What kind of system is this?

| N-Gram Index of Text 1 | Previous Character | Index | Next Character |
|---|---|---|---|
| 1-Gram Index of 1st Character | (None) | 日 | 本 |
| 1-Gram Index of 2nd Character | 日 | 本 | ー |
| ... | ... | ... | ... |
| 4-Gram Index of 2nd Character | 日 | 本IBM | は |
| ... | ... | ... | ... |
| 34-Gram Index of 1st Character | (None) | 日本 IBM は PureSystems を新時代の IT 製品として発表した。 | ... |
| ... | ... | ... | ... |

FIG. 5

| Examples of 2-Gram Indices from Texts | Previous Character | Index | Next Character |
|---|---|---|---|
| 4-Gram of 2nd Character in Text 1 | 日 | 本IBM | は |
| 4-Gram of 12th Character in Text 2 | 日 | 本IBM | は |
| 4-Gram of 2nd Character in Text 4 | 日 | 本IBM | は |
| 4-Gram of 15th Character in Text 5 | 日 | 本IBM | は |

| Examples of 34-Gram Indices from Texts | Previous Character | Index | Next Character |
|---|---|---|---|
| 34-Gram of 1st Character in Text 1 | (None) | 日本IBMはPureSystemsを新時代のIT製品として華々しく | 、 |
| 34-Gram of 11th Character in Text 2 | 「 | 日本IBMはPureSystemsを新時代のIT製品として発表した | 」 |
| 34-Gram of 1st Character in Text 4 | (None) | 日本IBMはPureSystemsを新時代のIT製品として発表した | 。 |
| 34-Gram of 14th Character in Text 5 | 、 | 日本IBMはPureSystemsを新時代のIT製品として華々しく | 」 |

FIG. 6

| No. | Quotation |
|---|---|
| 1 | 日本IBMはPureSystemsを新時代のIT製品として発表した。 |
| 2 | 日本IBMはPureSystemsを新時代のIT製品として発表 |
| 3 | PureSystemsを新時代のIT製品として発表した。 |
| 4 | [Nikko News] Company A announces new smart phone model. |
| 5 | New company president announced |
| 6 | My daughter won the national competition! |
| ⋮ | ⋮ |

FIG. 7

| No. | Identifier | Quotation | Final Reference | Other References |
|---|---|---|---|---|
| 1 | NEWS_TITLE1 | | http://www.XXXXXX.itrnews.co.jp/news1111 | http://XXX.XX/123XYZ<br>http://YYY.YY/987AB |
| 2 | NEWS_TITLE1 | 日本IBMはPureSystemsを新時代のIT製<br>品として発表 | http://www.XXXXXX.itrnews.co.jp/news1111 | http://XXX.XX/123XYZ<br>http://YYY.YY/987AB |
| 3 | NEWS_TITLE1 | 日本IBMはPureSystemsを新時代のIT製 | http://www.XXXXXX.itrnews.co.jp/news1111 | http://XXX.XX/123XYZ<br>http://YYY.YY/987AB |
| 4 | NIKKO_NEWS_0001 | 品として発表<br>PureSystemsを新時代のIT製品として発表 | http://nikko.com/news/20120xxxxx.html | http://XXX.XX/356CDE |
| 5 | IBM_PRESS_0034 | [Nikko News] Company A announces new smart phone model. | http://www.ibm.com/press/2012/0x/0x/xx | http://XXX.XX/456DEF |
| 6 | BLOG_0003 | New company president announced | | |
| 7 | URL_0004 | My daughter won the national competition! | http://www.blog.com/hogehoge/2012xxxx | http://XXX.XX/567EFG |
| ... | ... | ... | ... | ... |

```
Converted Texts

Text 1:
NEW_TITLE1: What kind of system is this?

Text 2:
Oh, wow! "NEW_TITLE1"

Text 3:
To_User I found this to be useful: NEW_TITLE1

Text 4:
NEW_TITLE1

Text 5:
RT To_User: NEW_TITLE1
```

INFORMATION PROCESSING APPARATUS, INFORMATION PROCESSING METHOD, AND INFORMATION PROCESSING PROGRAM

TECHNICAL FIELD

The present invention relates to an information processing apparatus, an information processing method, and an information processing program.

BACKGROUND ART

The analysis of texts created by users is known (see, for example, Japanese Laid-open Patent Publication No. 2011-3157).

SUMMARY OF THE INVENTION

Text posted on the internet sometimes includes many quotations not created by the person that has posted the text. When such quotations are massively made, they not only increase the amount of computations required for text analysis, but also render the information contained therein so dominant that the text is not properly analyzed.

One aspect of the present invention is directed to an information processing apparatus including: a detection unit for detecting from a plurality of texts quotations from other texts; a conversion unit for deleting or replacing with predetermined character strings the quotations in a plurality of the texts; and a text mining unit for executing text mining for a plurality of the converted texts. Other aspects of the present invention include a method executed by the information processing apparatus, and a program executed by a computer to function as the information processing apparatus.

This summary of the present invention is not intended to enumerate all of the required characteristics of the present invention. The present invention may be realized by any combination or sub-combination of these characteristics.

BRIEF DESCRIPTION OF THE DRAWINGS

FIG. 4 shows a reference table generated by a reference target detection unit in Step 102 of FIG. 2.

FIG. 5 shows an N-gram indexing executed by a determining unit in Step S104 of FIG. 2.

FIG. 6 shows an N-gram indexing executed by a determining unit in Step S104 of FIG. 2.

FIG. 7 shows a quoted string table generated by a determining unit in Step S104 of FIG. 2.

FIG. 8 shows a lookup table generated by a matching unit in Steps S108 and S110 of FIG. 2.

FIG. 9 shows the converted texts generated by a conversion unit 140 in Step S112 of FIG. 2.

DETAILED DESCRIPTION

The following is an explanation of the present invention with reference to an embodiment of the present invention. However, the present embodiment does not limit the present invention as described in the scope of the claims. Also, all combinations of characteristics explained in the embodiment are not necessarily required in the technical solution of the present invention.

Figure 1:
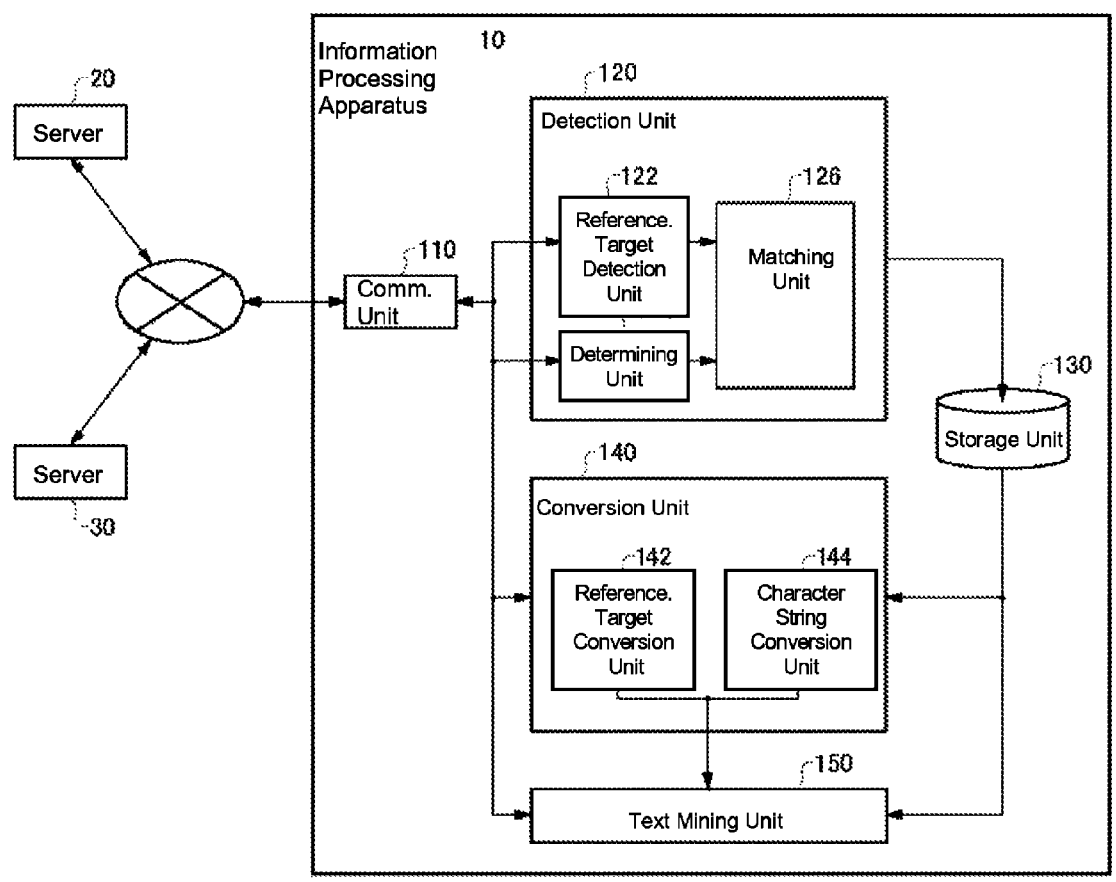
FIG. 1 shows the configuration of an information processing apparatus according to an embodiment of the present invention.

FIG. 1 shows a information processing apparatus 10 in accordance with an embodiment of the present invention. The information processing apparatus 10 obtains texts from servers 20 and 30, detects quotations in these texts, and converts the quotations into predetermined character strings. The information processing apparatus 10 has a communication unit 110, a detection unit 120, a storage unit 130, a conversion unit 140, and a text mining unit 150.

The communication unit 110 connects to a network such as the internet, and communicates with external devices via the network. For example, the communication unit 110 obtains texts from external devices such as servers 20 and 30. The communication unit 110 feeds the obtained texts to the detection unit 120 and the conversion unit 140.

The detection unit 120 detects quotations in the texts from other texts. The detection unit 120 has a reference target detection unit 122, a determining unit 124, and a matching unit 126.

The reference target detection unit 122 detects reference target information as a quotation included in the texts. The reference target detection unit 122 also determines whether or not the same information has been reached by using two or more different pieces of the detected reference target information. The reference target detection unit 122 may detect, as reference target information, information designating a location of a file, such as a uniform resource locator (URL). For example, the reference target detection unit 122 may detect that information such as the same website has been reached by using a regular URL and a shortened URL that is created by shortening the regular URL by using a redirection technique.

The reference target detection unit 122 creates a reference table for more than one piece of the reference target information that has reached information such as the same website. The table associates the final reference target information with one or more pieces of reference source information. References to direct or indirect sources are redirected to the final reference target. The reference detection unit 122 stores the created reference table in the storage unit 130.

The determining unit 124 determines, when an identical character string is detected commonly in more than one text, that the character string is a quotation. The determining unit 124 may determine that a character string is a quotation if the identical character string thus detected satisfies requirements such as the length exceeding a predetermined number of characters. The determining unit 124 generates a quoted character string table including character strings detected as quotations in the texts, and the quotation character string table is stored in the storage unit 130.

The matching unit 126 retrieves from the storage unit 130 the reference table including reference target information as quotations and the quoted character string table including character strings as quotations, and creates from these tables a lookup table assigning a different identifier for a different quotation.

The matching unit 126 may also determine that a quotation from the same information has been made when two or more of the detected character strings in the quoted character string table includes a common portion. In this case, the matching unit 126 may assign the same identifier to two or more of the character strings in the lookup table that shares the common portion.

The matching unit 126 also determines whether or not a character string that is a quotation included in a given text is included in information obtained by accessing a reference target designated by reference information included in the given text. If included, the matching unit 126 integrates the character string in the lookup table and the record for the reference target information as the same quotation. The matching unit 126 stores the lookup table in the storage unit 130.

The storage unit 130 stores the reference table received from the reference detection unit 122 and the quoted character string table received from the determining unit 124, and feeds them to the matching unit 126. The storage unit 130 also stores the lookup table received from the matching unit 126, and feeds it to the conversion unit 140. The storage unit 130 may be the main storage device or an auxiliary storage device in the information processing apparatus 10, or a storage device external to the information processing apparatus 10.

The conversion unit 140 replaces quotations in the texts with predetermined character strings, and generates converted texts. For example, the conversion unit 140 treats reference target information and/or identical characteristics in the texts as identical quotations, and replaces such quotations with identifiers for identifying the quotations. The conversion unit 140 has a reference target conversion unit 142 and a character string conversion unit 144.

The reference target conversion unit 142 replaces two or more pieces of reference information with an identical character string, in response to an output from the reference detection unit 122. For example, the reference target conversion unit 142 replaces reference target information in a text with the final reference target information in the lookup table or an identifier such as "NEWS_TITLE1".

The character string conversion unit 144 replaces identical character strings in the text with an identifier. For example, when a character string included in a text is identical to a character string in the lookup table, the character string in the text is replaced with an identifier such as "NEWS_TITLE1" corresponding to the character string in the lookup table.

The reference target conversion unit 142 and/or character string conversion unit 144 in the conversion unit 140 may delete a quotation in texts rather than convert the quotation to an identifier. The converted texts thus converted by the reference target conversion unit 142 and/or character string conversion unit 144 in the conversion unit 140 are fed to the text mining unit 150.

The text mining unit 150 receives the converted texts from the conversion unit 140, and executes text mining for the converted texts. For example, the text mining unit 150 measures the numbers of occurrence of the quotations of different contents in the converted texts.

Thus, the information processing device 10 in the present embodiment removes quotations from the texts by associating identical character strings occurring in the texts and identical quotations detected from the reference target information with identifiers to replace the quotations in the texts with the identifiers. In this way, the data processing apparatus 10 can execute text mining for original contents of the texts with quotations from other texts deleted. Further, the information processing apparatus 10 can analyze the identifiers in order to analyze quotation trends such as the distribution of the number of quotations in the texts.

Figure 2:
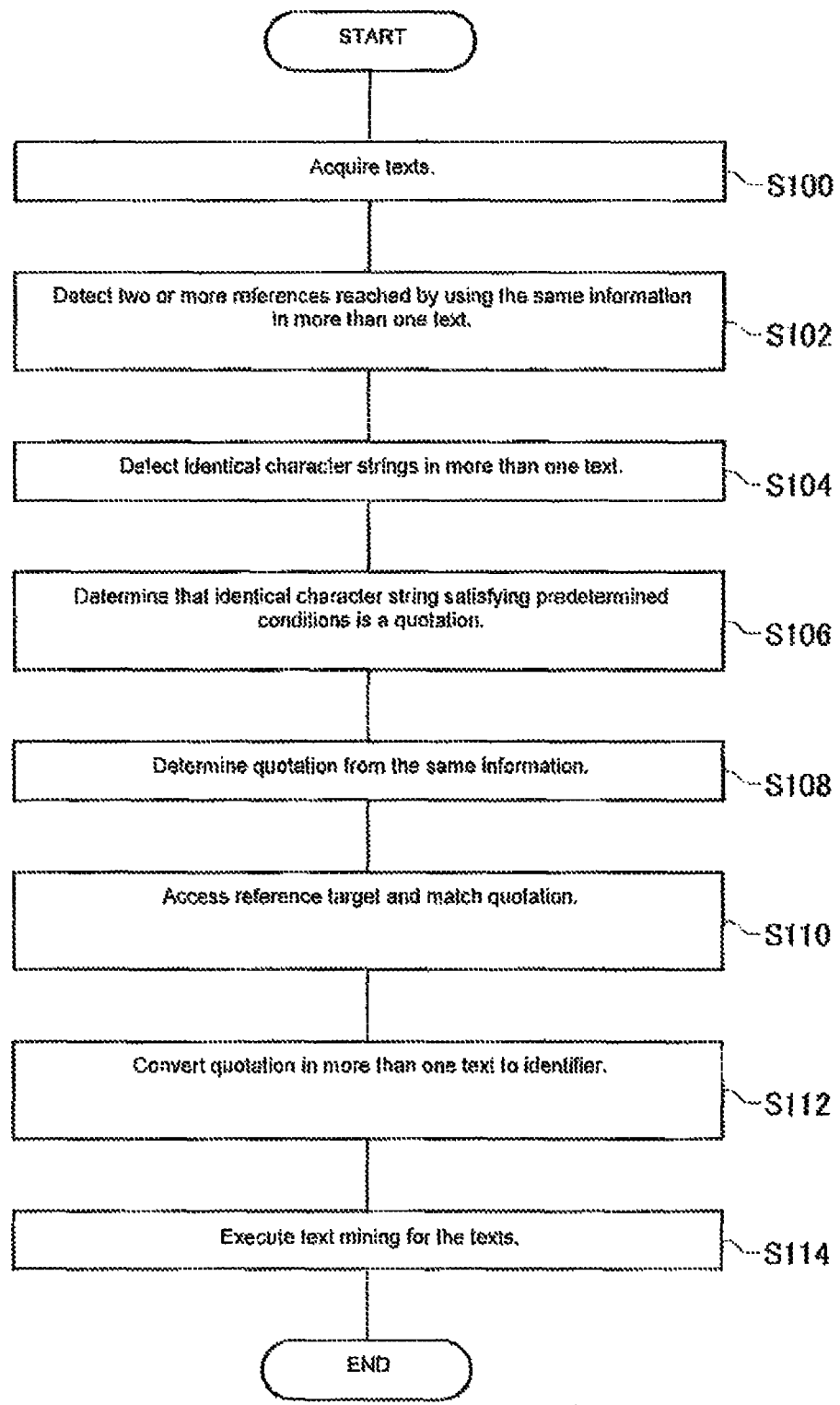
FIG. 2 shows the processing flow of an information processing apparatus according to an embodiment of the present invention.

FIG. 2 shows the processing flow of the information processing apparatus 10 in accordance with an embodiment. In the present embodiment, the information processing apparatus executes the process steps from S100 to S114.

In Step S100, the communication unit 110 obtains a plurality of texts by communicating with external devices such as server 20. For example, the communication unit 110 accesses, via a network such as the internet, posting sites such as blogs or a social network service and/or news sites such as web-based news sites and email-based news sites stored in the server 20, etc. The communication unit 110 feeds the obtained texts to the detection unit 120 and the conversion unit 140.

In Step 102, the reference target detection unit 122 detects reference target information included in a plurality of texts, and detects whether or not the same information has been reached by using two or more different pieces of reference target. Specifically, the reference target detection unit 122 first detects reference target information such as URLs in more than one text.

The reference target detection unit 122 detects redirection information for redirection to another reference target by accessing via the communication unit 110 a reference target such as a web page designated by the detected reference target information, and detecting the location value included in the HTTP header of the reference target. In response to obtaining redirection information, the reference target detection unit 122 executes a call to the URL of the redirection target to visit the redirection target.

When redirection information is not detected at the reference target designated by the reference information, the reference target detection unit 122 treats the reference target information as the final reference target information. Further, when reference target information indicating a regular reference target is included in information obtained by accessing the reference target designated by the reference target information, the reference target detection unit 122 may treat the reference target information indicating the regular reference as the final reference information.

For example, when a URL indicating a tag such as "canonical href" or "og:url" is included in the <Meta> element of a web page at the reference target, the reference target detection unit 122 may use this URL as the reference target information indicating a regular reference target.

The reference target detection unit 122 creates a reference table for more than one pieces of the reference target information that has reached the same website. The table associates the final reference target information with one or more pieces of reference source information. References to direct or indirect sources are redirected to the final reference target. The reference detection unit 122 stores the created reference table in the storage unit 130.

In Step S104, the determining unit 124 detects identical character strings in a plurality of the texts. For example, the determining unit 124 generates an N-gram index for the texts, and detects as quotations identical character strings shared by more than one text. The specific method used by the determining unit 124 to create N-gram indices will be explained below.

The determining unit 124 may determine that, if the length of the identical character string detected in a plurality of the texts is equal to or greater than a predetermined number of characters, the character string is a quotation. For example, the determining unit 124 may determine that only character strings with a length of 20 or more characters is a quotation.

This way the determining unit 124 does not detect character strings as quotations on a word basis. Texts just using the same word or idioms are kept from being misidentified as being referenced. Also, the determining unit 124 can economies the processing resources of the information processing apparatus 10 by avoiding processing character strings that are unlikely to be quotations.

In step S106, the determining unit 124 determines that, if a detected identical character string satisfies predetermined conditions, the character string is a quotation. For example, the determining unit 124 may determine that a character string is a quotation if an identical character string in multiple texts has been detected equal to or greater than a predetermined number (e.g., 10) of times.

In this way, the determining unit 124 can exclude from quotations character strings of less importance that are less referred to, thereby reducing the processing load on the conversion unit 140 of the information processing apparatus 10. The determining unit 124 generates a quoted character string table including character strings that have been determined to be quotations, and stores this quoted character string table in the storage unit 130.

In Step S108, the matching unit 126 retrieves from the storage unit 130 the reference table including reference target information as quotations and the quoted character string table including character strings as quotations, and creates from the tables a lookup table assigning a different identifier to a different quotation. For example, the matching unit 126 creates a lookup table assigning different identifiers, such as "NEWS_TITLE1" and "NEWS_TITLE2" to a respective character string in the quotation character string table and the reference target information in the reference table.

The matching unit 126 also looks up character strings in the lookup table including a common portion. When there is a common potion, the matching unit 126 determines that the character strings including the common portion is a quotation from the same information, and assigns the same identifier to these character strings in the lookup table.

For example, the matching unit 126 assigns the same identifier to the character string "I B M Wa P u r e S y s t m s wo Shin Ji Dai No I T Sei Hin To Shi Te Hatsu Pyou Shi Ta" and the character string "Ni Hon I B M Wa P u r e S y s t m s wo Shin Ji Dai No I T Sei Hin To Shi Te Hatsu Pyou" because they include a common portion "I B M Wa P u r e S y s t m s wo Shin Ji Dai No I T Sei Hin To Shi Te Hatsu Pyou".

In Step S110, the matching unit 126 accesses, via the communication unit 110, the reference target designated by the final reference target information of the lookup table, and determines whether any character string in the lookup table is included at the reference target. When at least a portion of the text in the reference target matches a character string in the lookup table for example, the matching unit 126 determines that the character string is a quotation from the reference target.

When the matching unit 126 has determined that a character string is a quotation, it integrates the character string in the lookup table and the record for the reference target information as the same quotation to assign the same identifier to the character string and to the reference target information. The matching unit 126 then stores the lookup table in the storage unit 130.

In Step S112, the conversion unit 140 replaces quotations in a plurality of the texts with an identifier or similar information to generate converted text. Specifically, the reference target conversion unit 142 retrieves the lookup table from the storage unit 130 and, when reference target information in a text matches the final reference target information or other reference information in the lookup table, replaces the reference target information in the texts with the final target reference information or an identifier corresponding to the reference target information, such as "NEWS_TITLE1".

When the reference target information in more than one text is included in other reference target information in the lookup table, the reference conversion unit 142 may replace the other reference target information included in the texts with a regular reference target information corresponding to the other reference target information.

The character string conversion unit 144 replaces identical character strings in the texts with an identifier. For example, when a character string included in a text is identical to a character string in the lookup table, the character string conversion unit 144 replaces the identical character string in the text with an identifier corresponding to the character string in the lookup table, such as "NEWS_TITLE1".

The character string conversion unit 144 determines whether or not a character string in the lookup table matches the entirety of any one of the texts. When there is no such match, the quotation in the text is deleted or replaced with a predetermined character string. When a character string in the lookup table matches the entirety of one of the texts, the character string conversion unit 144 may not replace the text. In this way, the character string conversion unit 144 can distinguish a text quoting the entirety of another text, such as a "retweet" on Twitter (registered trademark), from a quotation.

The character string conversion unit 144 may also delete character strings of low importance included in q plurality of the texts or replace such character strings with another character string. For example, it may use a regular expression to detect a character string designating an addressee (e.g., "@Hogehoge" linking a user name to the character "@"), and replace the character string with an identifier indicating originally it is an address (e.g., "To_User"). Also, for example, the character string conversion unit 144 may use a regular expression to detect a character string indicating a topic of a text (e.g., a tag "#IBM_News" linking a topic to the symbol "#"), and then delete the character string.

The conversion unit 140 may have the reference conversion unit 142 convert a plurality of texts received from the communication unit 110 first, thereafter subjecting the converted texts to conversion by the character string conversion unit 144. Conversely, the conversion unit 140 may have the texts converted by the character string conversion unit 144 first, followed by conversion by the reference conversion unit 142.

Alternatively, the conversion unit 140 may have either the reference conversion unit 142 or the character string conversion unit 144 convert quotations in a plurality of texts. Further, alternatively, the conversion unit 140 may have either the reference conversion unit 142 or the character string conversion unit 144 delete the quotations in the texts instead of replacing the quotations with identifiers.

When the quotations in texts have been converted by both the reference conversion unit 142 and the character string conversion unit 144 and therefore the same identifier is duplicated in the converted text, the conversion unit 140 may delete either one of the identifiers. The conversion unit 140 feeds the converted text from the reference conversion unit 142 and/or the character string conversion unit 144 to the text mining unit 150.

In Step S114, the text mining unit 150 receives the converted texts from the conversion unit 140, and executes text mining for the converted texts to analyze the contents of the texts. The text mining unit 150 may perform text mining using an analytical tool such as IBM Context Analytics (ICA), Text Network Analysis (TENA) or IBM SPSS Text Analytics.

For example, the text mining unit 150 may count the number of each identifier in the texts to respectively measure the numbers of occurrence of the quotations of different contents in the converted texts.

Also, the text mining unit 150 may calculate the degree of similarity the quotations of different contents and group the quotations based on the degree of similarity, thereby grouping the converted texts. Specifically, the text mining unit 150 retrieves the lookup table from the storage unit 130, and calculates the degree of similarity between character strings in the lookup table based, for example, on the distance between words in semantic space.

Next, the text mining unit 150 groups the character strings having a similarity within a predetermined range, and classifies into the same group the converted texts including character strings classified in one group. In this way, the text mining unit 150 can group and analyze texts with reference sources being different but topics being similar.

The text mining unit 150 may also group two or more of the quotations when information available from reference targets associated with two or more of the quotations of different contents includes reference target information designating an identical reference target. Specifically, when identical reference target information is associated with different character strings in the lookup table, the text mining unit 150 may group the different character strings together in the same group. In this way, the text mining unit 150 may group together and analyze texts with quotations literally different but highly probably with similar contents.

The text mining unit 150 may also calculate the degree of similarity between information available from reference targets associated with the different quotations of different contents, and group the quotations based on the degree of similarity. Specifically, the text mining unit 150 accesses a reference target designated by the reference target information included in the lookup table, and calculates the degree of similarity between texts included in, for example, the web pages at the reference targets based on the distance in the semantic space between words included in the text.

Next, the text mining unit 150 groups reference target information referring to the texts having a similarity within a predetermined range, in the same group. In this way, the text mining unit 150 can bring together and analyze texts that quote web sites with similar contents.

The text mining unit 150 analyzes, for each one of the texts, the influence of a sender, evaluation of the quotation (for example, evaluation of favorable or unfavorable feelings) and/or an analysis of topics (for example, an analysis of notable words, news or people).

Thus, the information processing apparatus 10 in the present embodiment deletes quotations in texts or replaces them with identifiers to create converted text, and executes text mining for the converted text. In this way, the information processing apparatus 10 in the present embodiment can prevent the waste of computing resources on quotations when text mining is executed for quotations. The information processing apparatus 10 can also preclude the effects of quotations from affecting the results of text mining.

In the processing flow of the embodiment explained in FIG. 2, the character string conversion unit 144 may replace character strings of low importance in the text subsequently to Step S100 rather than at Step S112. In this case, the character string conversion unit 144 feeds the replaced text to the detection unit 120. This enables the detection unit 120 to detect quotations slightly different in, for example, addresses, as the same quotation, thereby improving the accuracy of the detection of quotations.

Figure 3:
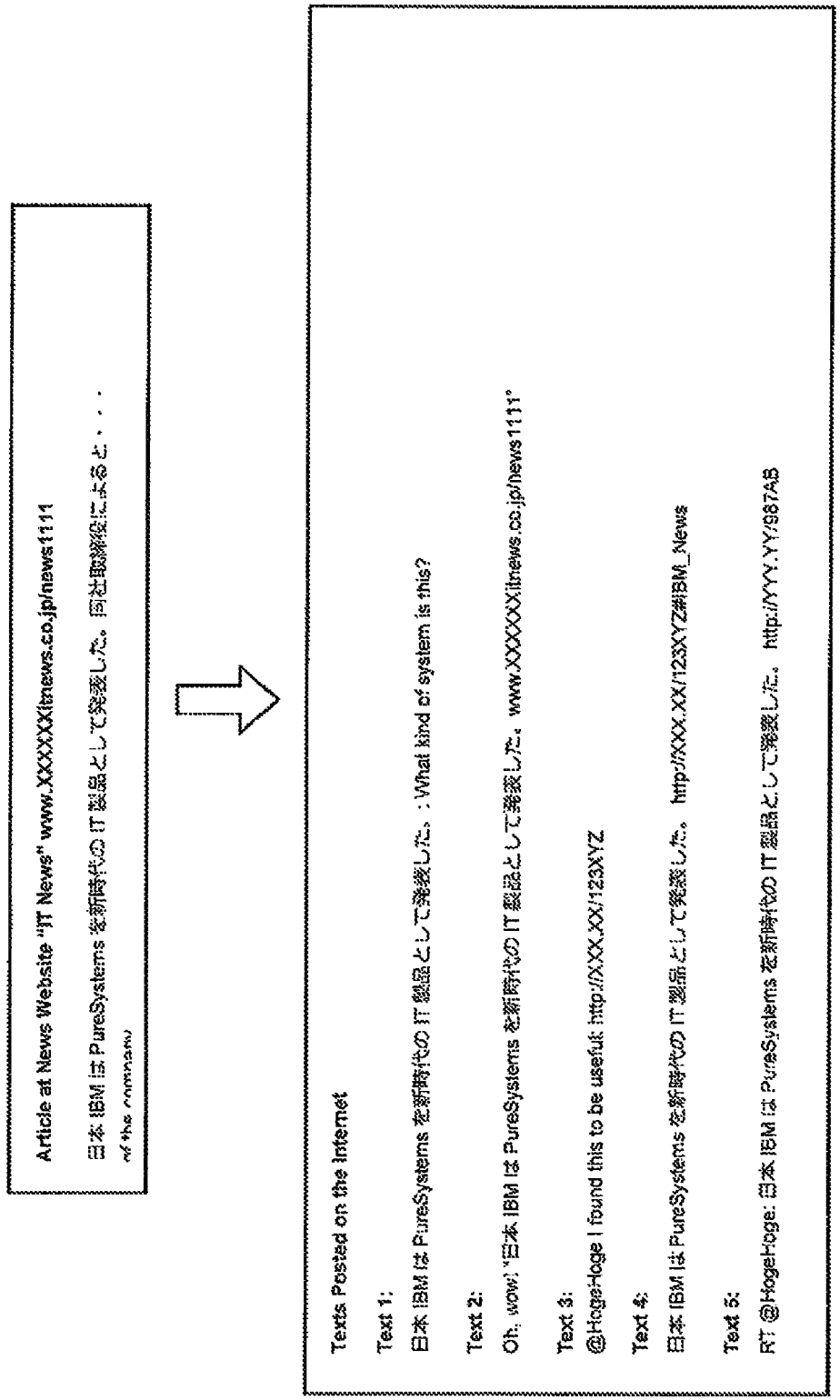
FIG. 3 shows texts obtained by a information processing apparatus in Step S100 of FIG. 2.

FIG. 3 shows texts obtained by the information processing apparatus 10 in Step S100. In the present embodiment, as shown in FIG. 3, an article is published on the web site "IT News (URL: http://www.XXXXXXitnews.co.jp/news1111)" that says "Ni Hon I B M Wa P u r e S y s t m s wo Shin Ji Dai No I T Sei Hin To Shi Te Hatsu Pyou Shi Ta. Dou Sha Tori Shimari Yaku Ni Yo Ru To (rest omitted) . . . ", and Texts 1-5 are posted which quote the content of this article.

As shown in FIG. 3, Texts 1-5 include the quotation from the article, "Ni Hon I B M Wa P u r e S y s t m s wo Shin Ji Dai No I T Sei Hin To Shi Te Hatsu Pyou Shi Ta." Because this portion is not an original portion in the posted texts, its value as the subject of analysis is low. For example, when the text mining unit 150 executes text mining for the texts shown in FIG. 3, words such as "IBM", "Pure Systems", "IT" and "Hatsu Pyou" are counted as frequently occurring characters.

Texts 1-5 include the URL of the article and its shortened URLs (http://XXX.XX/123XYZ and http://YYY.YY/987AB). However, because these URLs are not an original portion in the posted texts, their values as the subject of analysis is low.

FIG. 4 shows an example of a reference table generated by the reference target detection unit 122 in Step S102. As shown in FIG. 4, the reference target detection unit 122 generates a reference table associating "final reference target information (for example, http://www.XXXXXXitnews.co.jp/news1111)" with "other reference target information (for example, shortened addresses for the final reference target information http://XXX.XX/123XYZ and http://YYY.YY/987AB)". The reference target detection unit 122 may also associate each reference target information with the number of its occurrences in the texts.

FIG. 5 and FIG. 6 show an N-gram indexing executed by the determining unit 124 for Texts 1-5 in Step S104. FIG. 5 shows an N-gram index for Text 1 generated by the determining unit 124.

For example, as shown in the second line of the table in FIG. 5, the determining unit 124 generates an index for one-character "Ni" from the first character in Text 1 as a "1-gram index for the first character" in Text 1 "Ni Hon I B M Wa P u r e S y s t m s wo Shin Ji Dai No I T Sei Hin To Shi Te Hatsu Pyou Shi Ta. [IBM Japan has announced Pure Systems as an IT product for a new era.]: What kind of system is this?". The determining unit 124 also detects characters before and after "Ni". Because "Ni" is the first character, the determining unit 124 does not detect a previous character, i.e., character immediately before "Ni". The determining unit 124 detects "Hon" as next character, i.e. character immediately after "Ni".

Also, as shown in the third line of the table, the determining unit 124 generates the index for "Hon" as the "1-gram index for the second character", and detects "Ni" and "I" as the "previous character" and "next character". Similarly, the determining unit 124 generates the index for "Hon I B M" as the "4-gram index of the second character" in Text 1, and detects "Ni" and "Wa" as the "previous character" and "next character".

In this way, the determining unit 124 generates an i-gram index in Text 1 with n characters for the first character through the (n-i+1)th character, where i is a natural number satisfying the inequality 1≤i≤n−1. The determining unit 124 similarly generates an N-gram index for Texts 2-5.

The determining unit 124 does not have to generate an n-gram index for a text with n characters. For example, the determining unit 124 does not detect as a quotation a retweet that reposts a text posted by another user in its entirety. In this case, the character string conversion unit 144 in Step S112 does not have to make a determination that the text matches the entirety of another one of a plurality of texts.

Also, the determining unit 124 does not have to sample, as another index in a text, a character string that is identical to a character string that was already sampled as an index in the text. In this way, the determining unit 124 avoids generating an index for an identical character string in duplicate. This economizes processing resources in the information processing apparatus 10.

FIG. 6 shows N-gram indices generated by the determining unit 124 for Texts 1-5. The upper table in FIG. 6 shows an index portion of the character string "Hon I B M" generated by the determining unit 124 as a 4-gram index for the second character in Text 1, the 12th character in Text 2, the second character in Text 4, and the 15th character in Text. In other words, from the N-gram indices, the determining unit 124 detects the identical character string "Hon I B M" included in Text 1, Text 2, Text 4 and Text 5.

Other examples of the N-gram indices are shown in the lower table in FIG. 6 including an index portion of the character string "Ni Hon I B M Wa P u r e S y s t m s wo Shin Ji Dai No I T Sei Hin To Shi Te Hatsu Pyou Shi Ta." generated by the determining unit 124 as a 34-gram index for the first character in Text 1, the 11th character in Text 2, the first character in Text 4, and the 14th character in Text 5 among the N-gram indices for Texts 1-5. In other words, from the N-gram indices, the determining unit 124 detects the identical character string "Ni Hon I B M Wa P u r e S y s t m s wo Shin Ji Dai No I T Sei Hin To Shi Te Hatsu Pyou Shi Ta." included in Text 1, Text 2, Text 4 and Text 5.

After N-gram indices have been generated for Texts 1-5, the determining unit 124 detects as quotations a character strings in the N-gram indices that do not share previous and characters with another text.

Taking the upper table as an example, the previous character "Ni" and the next character "Wa" of the character string "Hon I B M" shared by a plurality of texts are common to Texts 1, 2, 4 and 5. On the other hand, in the bottom table, the previous and next characters of the shared character string "Ni Hon I B M Wa P u r e S y s t m s wo Shin Ji Dai No I T Sei Hin To Shi Te Hatsy Pyou Shi Ta." are not shared by Text 1, 2, 4 and 5. In this case, the determining unit 124 does not detect the character string "Hon I B M" as a quotation, but does detect the character string "Ni Hon I B M Wa P u r e S y s t m s wo Shin Ji Dai No I T Sei Hin To Shi Te Hatsu Pyou Shi Ta." as a quotation.

In this way, the determining unit 124 detects as a quotation the longest one of identical character strings shared by the texts, and does not detect as a quotation any character string shorter than the longest one. Therefore, the determining unit 124 can omit the processing of character strings that are essentially the same as the longest character string, and can economize the processing resources of the information processing apparatus 10. In this way, the determining unit 124 detects character strings in the texts that are quotations, and generates a quoted character string table from the detected character strings.

FIG. 7 shows a quoted character string table generated by the determining unit 124 in Step S104. As shown in the drawing, the determining unit 124 generates a quoted character string table including, as quotations, character string 1 "Ni Hon I B M Wa P u r e S y s t m s wo Shin Ji Dai No I T Sei Hin To Shi Te Hatsu Pyou Shi Ta.", character string 2 "Ni Hon I B M Wa P u r e S y s t m s wo Shin Ji Dai No I T Sei Hin To Shi Te Hatsu Pyou", character string 3 "P u r e S y s t m s wo Shin Ji Dai No I T Sei Hin To Shi Te Hatsu Pyou Shi Ta.", character string 4 "[Nikko News] Company A announces new smart phone model", character string 5 "New company president announced", and character string 6 "My daughter won the national competition". Here, character string 1 includes character string 2 and character string 3, but the determining unit 124 detects them as separate quotations.

FIG. 8 shows a lookup table generated by the matching unit 126 in Step S108 and in Step S110. In Step S108, the matching unit 126 determines that the quotations as indicated by character string 1, character string 2, and character string 3 including a common portion, are quotations from the same information, and generates a lookup table that the same identifier "NEWS_TITLE1" is assigned to the entities of the quoted character string table.

Recognizing character strings 1-3 are included in the final reference target referred to by http://www.XXXXXXitnews-.co.jp/news1111, the matching unit 126, in Step S110, associates character strings 1-3 with the final reference target information and other reference target information referring to the final reference target information, in the lookup table. In this way, the matching unit 126 generates a lookup table that identifiers, quotations, final reference target information, and other reference target information are associated with each other.

FIG. 9 shows an example of converted text generated by the conversion unit 140 in Step S112. As shown in the drawing, the character string conversion unit 144 converts character string "Ni Hon I B M Wa P u r e S y s t m s wo Shin Ji Dai No I T Sei Hin To Shi Te Hatsu Pyou Shi Ta." in Texts 1-5 with the identifier "NEWS_TITLE1", and the reference target conversion unit 142 replaces the reference target information with the identifier "NEWS_TITLE1".

Because Texts 2, 4 and 5 include both character string "Ni Hon I B M Wa P u r e S y s t m wo Shin Ji Dai No I T Sei Hin To Shi Te Hatsu Pyou Shi Ta." and the reference target information, the conversion unit 140 can delete either the character string or the reference target information instead of replacing it. The character string conversion unit 144 also replaces "@Hogehoge" indicating an addressee with "To_User", and deletes the tag "#IBM_News".

By executing text mining for the converted texts shown in FIG. 9, the text mining unit 150 can count how many times "NEWS_TITLE1" appeared in text belonging to a specific group within a certain period of time. In this way, the information processing apparatus 10 in the present embodiment can analyze the frequency of a quotation for each content of the quotation.

Figure 10:
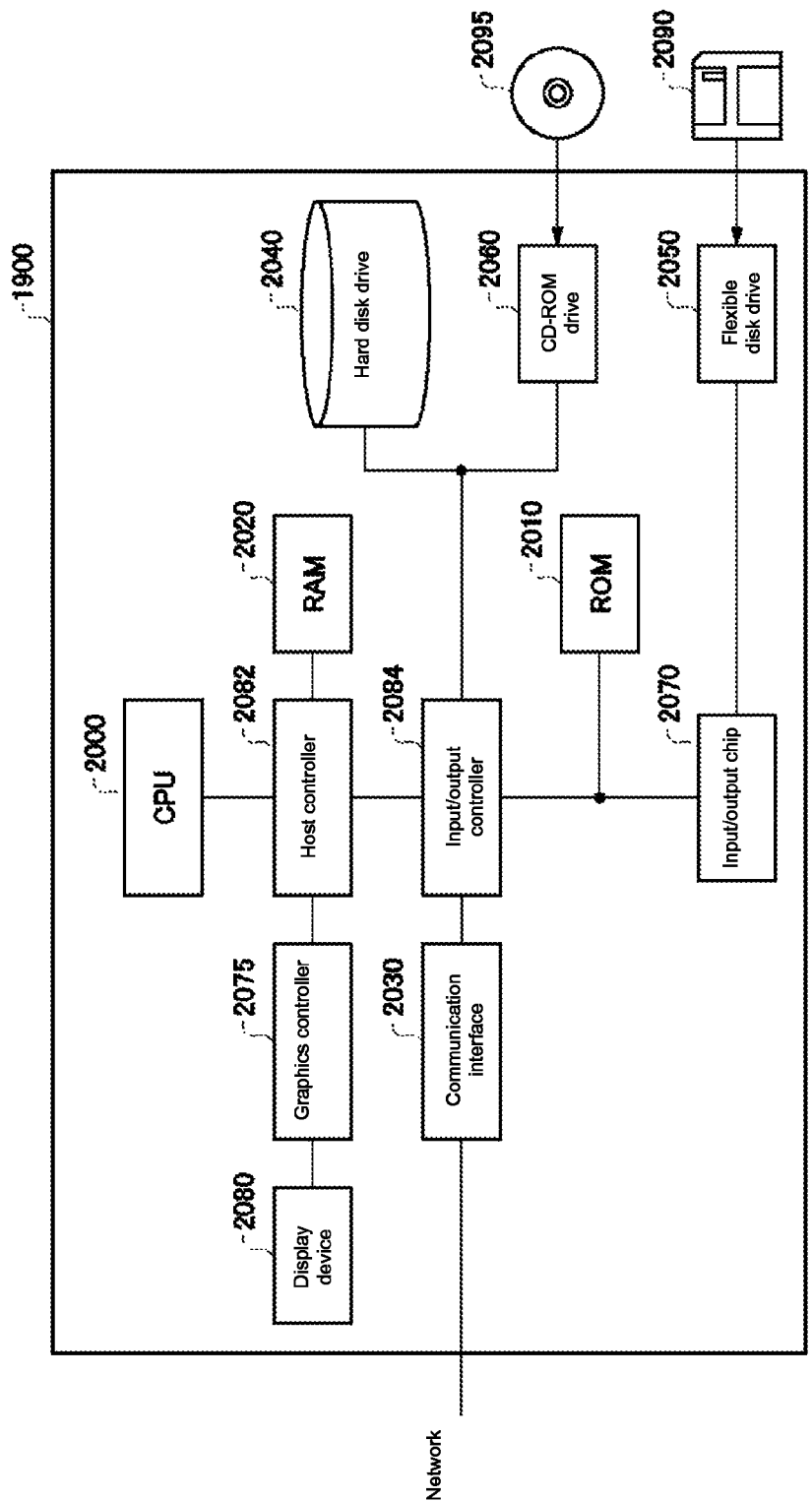
FIG. 10 shows an example of a hardware configuration for a computer.

FIG. 10 shows an example of a hardware configuration for the computer 1900 serving as the information processing apparatus 10. The computer 1900 in the present embodiment is equipped with a CPU peripheral portion having a CPU 2000, RAM 2020, graphics controller 2075 and display device 2080 connected to each other by a host controller 2082, an input/output portion having a communication interface 2030, a hard disk drive 2040 and a CD-ROM drive 2060 connected to the host controller 2082 by an input/output controller 2084, and a legacy input/output portion having a ROM 2010, flexible disk drive 2050, and input/output chip 2070 connected to the input/output controller 2084.

The host controller 2082 is connected to RAM 2020, a CPU 2000 accessing the RAM 2020 at a high transfer rate, and a graphics controller 2075. The CPU 2000 is operated on the basis of a program stored in the ROM 2010 and the RAM 2020, and controls the various units. The graphics controller 2075 obtains the image data generated in the frame buffer of the RAM 2020 by the CPU 2000 and other units, and displays this image data on the display device 2080. Alternatively, the graphics controller 2075 can include a frame buffer for storing image data generated by the CPU 2000 and other units.

The input/output controller 2084 is connected to a host controller 2082, a communication interface 2030 serving as a relatively high-speed input/output device, a hard disk drive 2040, and a CD-ROM drive 2060. The communication interface 2030 communicates with the other devices via a wired or wireless network. The communication interface also functions as hardware for communicating with the outside. The hard disk drive 2040 stores the programs and data used by the CPU 2000 in the computer 1900. The CD-ROM drive 2060 reads programs and data from the CD-ROM 2095 and provides them to the hard disk drive 2040 via the RAM 2020.

The input/output controller 2084 is connected to the ROM 2010, the flexible disk drive 2050, and the relatively low-speed input/output device of the input/output chip 2070. The ROM 2010 stores the boot program executed by the computer 1900 at startup and/or programs relying on hardware in the computer 1900. The flexible disk drive 2050 reads programs or data from a flexible disk 2090, and provides the programs and data to the hard disk drive 2040 via the RAM 2020. The input/output chip 2070 connects the flexible disk drive 2050 to the input/output controller 2084, and various types of input/output device are connected to the input/output controller 2084 via a parallel port, serial port, keyboard port, or mouse port, etc.

A program provided to the hard disk drive 2040 via the RAM 2020 is stored on a recording medium such as a flexible disk 2090, CD-ROM 2095 or IC card, and provided by the user. A program is read from the recording medium, installed in the hard disk drive 2040 inside the computer 1900 via the RAM 2020, and executed by the CPU 2000.

Programs installed in the computer 1900 for enabling the computer 1900 to function as information processing apparatus 10 include a communication module, detection module, reference target detection module, determination module, matching module, conversion module, reference target conversion module, character string conversion module, and text mining module. These programs or modules may be activated by the CPU 2000 to enable the computer 1900 to function as a communication unit 110, detection unit 120, reference target detection unit 122, determining unit 124, matching unit 126, conversion unit 140, reference target conversion unit 142, character string conversion unit 144, and text mining unit 150.

The information processing steps coded in these programs are specific means activated by reading the programs to the computer 1900 so that the software cooperates with the various types of hardware resources as described above. These specific means function as a communication unit 110, detection unit 120, reference target detection unit 122, determining unit 124, matching unit 126, conversion unit 140, reference target conversion unit 142, character string conversion unit 144, and text mining unit 150. These specific means realize operations and the processing of information in the computer 1900 of the present embodiment to configure an information processing apparatus 10 for the purpose intended herein.

For example, when the computer 1900 communicates with an external device, the CPU 2000 executes the communication program loaded in the RAM 2020, and instructs the communication interface 2030 in the communication processing on the basis of the processing content described in the communication program. The communication interface 2030 is controlled by the CPU 2000, and reads the transmitted data stored in the transmission buffer region of a memory device such as the RAM 2020, hard disk drive 2040, flexible disk 2090 or CD-ROM 2095, or writes reception data received from the network to a reception buffer region of the storage device. In this way, the communication interface 2030 transfers transmitted and received data to the storage device using the DMA (Direct Memory Access) method. Alternatively, the CPU 2000 transfers transmitted and received data by reading data from the source storage device or communication interface 2030, and transfers and writes data to the destination communication interface 2030 or storage device.

Also, the CPU 2000 writes all of the data or the necessary data to the RAM 2020 via, for example, a DMA transfer, from files or databases stored in an external storage device such as a hard disk drive 2040, a CD-ROM drive 2060 (CD-ROM 2095) or a flexible disk drive 2050 (flexible disk 2090), and performs various types of processing on the data in the RAM 2020. The CPU 2000 then writes the processed data to the external storage device via, for example, a DMA transfer. Because the RAM 2020 temporarily stores the contents of the external storage device during this process, the RAM 2020 and the external storage device are generally referred to in the present embodiment as memory, a storage unit, or a storage device. These may function as the storage unit 130. The various types of information in the various types of programs, data, tables and databases of the present embodiment are stored in these memory devices, and are the targets of information processing. The CPU 2000 can hold some of the RAM 2020 in cache memory, and read and write data to the cache memory. Here, the cache memory performs some of the functions of the RAM 2020. Therefore, this division is excluded in the present embodiment. Cache memory is included in the RAM 2020, the memory, and/or the storage device.

The CPU 2000 also performs various types of processing on data read from the RAM 2020 including the operations, processing, condition determination, and information retrieval and substitution described in the present embodiment and indicated by a sequence of instructions in the program, and writes the results to the RAM 2020. For example, when performing a condition determination, the CPU 2000 compares various types of variables described in the present embodiment to other variables or constants to determine whether or not conditions such as greater than, less than, equal to or greater than, equal to or less than or equal to have been satisfied. When a condition has been satisfied (or not satisfied), the process branches to a different sequence of instructions or calls up a subroutine.

The CPU 2000 can also retrieve information stored in files and databases inside the memory device. For example, when a plurality of entries associating an attribute value for a second attribute to an attribute value for a first attribute, the CPU 2000 can retrieve an entry verifying the conditions indicated by the attribute value of the first attribute among the plurality of entries stored in the storage device, and then obtaining the attribute value of the second value associated with the first value satisfying a predetermined condition by reading the attribute value of the second attribute stored in the entry.

A program or module described above can be stored in a recording medium of an external unit. Instead of a flexible disk 2090 or a CD-ROM 2095, the recording medium can be an optical recording medium such as a DVD or CD, a magneto-optical recording medium such as MO, a tape medium, or a semiconductor memory such as an IC card. The recording medium can also be a storage device such as a hard disk or RAM provided in a server system connected to a dedicated communication network or the internet, and the program can be provided to the computer 1900 via the network.

The present invention was explained using an embodiment, but the technical scope of the present invention is not limited to the embodiment described above. The possibility of many changes and improvements to this embodiment should be apparent to those skilled in the art. Embodiments including these changes and improvements are within the technical scope of the present invention, as should be clear from the description of the claims.

The order of execution for operations, steps and processes in the devices, systems, programs and methods described in the claims, description and drawings was described using such terms as "previous" and "prior". However, these operations, steps and processes can be realized in any order as long as the output of the previous process is used by the subsequent process. The operational flow in the claims, description and drawings were explained using terms such as "first" and "next" for the sake of convenience. However, the operational flow does not necessarily have to be executed in this order.

REFERENCE NUMBER LIST

10: Information processing apparatus
20: Server
30: Server
110: Communication unit
120: Detection unit
122: Reference target detection unit
124: Determining unit
126: Matching unit
130: Storage unit
140: Conversion unit
142: Reference target conversion unit
144: Character string conversion unit
150: Text mining unit
1900: Computer
2000: CPU
2010: ROM
2020: RAM
2030: Communication interface
2040: Hard disk drive
2050: Flexible disk drive
2060: CD-ROM drive
2070: Input/output chip
2075: Graphics controller
2080: Display device
2082: Host controller
2084: Input/output controller
2090: Flexible disk
2095: CD-ROM

The invention claimed is:

1. An information processing apparatus comprising:
a memory;
a processor in communication with the memory, wherein the information processing apparatus is configured to perform a method, the method comprising:
detecting, from a plurality of texts, quotations from other texts, by a detection unit having a matching unit for determining that a character string included in a text is a quotation from a reference target when the character string is included in information obtained by accessing the reference target designated by reference target information included in the text;
deleting or replacing with predetermined character strings the quotations in a plurality of the texts in the memory; and
executing text mining for a plurality of the converted texts, the text mining unit calculating the degree of similarity between information available from reference targets associated with different quotations of different contents, grouping the quotations based on the degree of similarity, and grouping two or more of the quotations when information available from reference targets associated with two or more of quotations of different contents includes reference target information designating an identical reference target.

2. The information processing apparatus according to claim 1, the detection unit having a reference target detection unit for visiting reference targets designated by reference information included in the plurality of the texts to detect that the same information being reached by using two or more pieces of reference information; and
the conversion unit having a reference conversion unit for replacing the two or more pieces of reference information with the same character string in response to an output from the reference detection unit.

3. The information processing apparatus according to claim 2, the reference target detection unit accessing a reference target designated by reference target information, and visiting a redirection target in response to obtaining redirection information for redirection to another reference target.

4. The information processing apparatus according to claim 2, the reference target conversion unit replacing reference target information with regular reference target information when reference target information indicating a regular reference target is included in information obtained by accessing the reference target designated by the reference target information.

5. The information processing apparatus according to claim 1, the detection unit having a determining unit for determining that a character string is a quotation in response to detection of an identical character string in a plurality of the texts.

6. The information processing apparatus according to claim 5, the determining unit determining that the character string is a quotation if the length of the identical character string detected in a plurality of the texts is equal to or greater than a predetermined number of characters.

7. The information processing apparatus according to claim 5, the determining unit determining that the character string is a quotation if the identical character string has been detected in a plurality of the texts equal to or more than a predetermined number of times.

8. The information processing apparatus according to claim 5, the conversion unit deleting or replacing with a predetermined character string a quotation in a text of a plurality of the texts if the identical character string detected in the texts does not match the entirety of the text.

9. The information processing apparatus according to claim 5, the matching unit determining that quotation has been made from the same information when two or more of the detected quotations include a common portion.

10. The information processing apparatus according to claim 5, the conversion unit replacing the identical quotation in a plurality of the texts with identifiers for identifying the quotation.

11. The information processing apparatus according to claim 10, the text mining unit respectively measuring the numbers of occurrence of the quotations of different contents in the converted texts.

12. The information processing apparatus according to claim 11, the text mining unit calculating the degree of similarity between the quotations of different contents, and grouping the quotations based on the degree of similarity.

13. The information processing apparatus of claim 1, wherein executing text mining further comprises analyzing the predetermined character strings in order to analyze quotation trends.

14. An information processing method comprising:
detecting, by a detection unit having a matching unit for determining that a character string included in a text is a quotation from a reference target when the character string is included in information obtained by accessing the reference target designated by reference target information included in the text, from a plurality of texts, quotations from other texts;
deleting or replacing with predetermined character strings the quotations in a plurality of the texts in a memory;
executing text mining for a plurality of the converted texts by calculating the degree of similarity between information available from reference targets associated with different quotations of different contents, and grouping the quotations based on the degree of similarity; and
replacing reference target information with regular reference target information when reference target information indicating a regular reference target is included in information obtained by accessing the reference target designated by the reference target information.

15. The information processing method according to claim 14, further comprising visiting reference targets designated by reference information included in the plurality of the texts to detect that the same information being reached by using two or more pieces of reference information; and
replacing the two or more pieces of reference information with the same character string in response to an output from the reference detection unit.

16. The information processing method according to claim 14, further comprising determining that a character string is a quotation in response to detection of an identical character string in a plurality of the texts.

17. The information processing method according to claim 16, further comprising deleting or replacing with a predetermined character string a quotation in a text of a plurality of the texts if the identical character string detected in the texts does not match the entirety of the text.

18. The information processing method according to claim 14, further comprising grouping two or more of the quotations when information available from reference targets associated with two or more of quotations of different contents includes reference target information designating an identical reference target.

19. An information processing program stored on a non-transitory computer readable hardware device and executed by a computer to function as:
a detection unit for detecting from a plurality of texts quotations from other texts, the detection unit having a matching unit for determining that a character string included in a text is a quotation from a reference target when the character string is included in information obtained by accessing the reference target designated by reference target information included in the text;
a conversion unit for deleting or replacing with predetermined character strings the quotations in a plurality of the texts; and
a text mining unit for executing text mining for a plurality of the converted texts, the text mining unit calculating the degree of similarity between information available from reference targets associated with different quotations of different contents, grouping the quotations based on the degree of similarity, and grouping two or more of the quotations when information available from reference targets associated with two or more of quotations of different contents includes reference target information designating an identical reference target.

* * * * *